United States Patent [19]

Matsubara et al.

[11] Patent Number: 4,763,119
[45] Date of Patent: Aug. 9, 1988

[54] IMAGE PROCESSING SYSTEM FOR AREA FILLING OF GRAPHICS

[75] Inventors: Shigeru Matsubara, Yamato; Tohru Mori; Toshiroh Tabata, both of Fujisawa, all of Japan

[73] Assignee: International Business Machines Corporation, Armonk, N.Y.

[21] Appl. No.: 853,802

[22] Filed: Apr. 18, 1986

[30] Foreign Application Priority Data

Apr. 24, 1985 [JP] Japan .................................. 60-86478

[51] Int. Cl.$^4$ ............................................. G09G 1/14
[52] U.S. Cl. .................................. 340/747; 340/709; 340/728
[58] Field of Search ........................ 340/747, 709, 728

[56] References Cited

U.S. PATENT DOCUMENTS

| | | | |
|---|---|---|---|
| 4,189,743 | 2/1980 | Schure et al. ....................... | 340/747 |
| 4,626,838 | 12/1986 | Tsujioka et al. ..................... | 340/728 |
| 4,646,076 | 2/1987 | Wiedenman et al. ................ | 340/728 |
| 4,658,247 | 4/1987 | Gharachorloo ..................... | 340/747 |

Primary Examiner—Howard A. Birmiel
Attorney, Agent, or Firm—Thomas P. Dowd

[57] ABSTRACT

An area fill technique for graphic images is disclosed wherein the contour lines constituting an image are given in a series of line segments or a series of vectors, and horizontal line segments are ignored. Each line segment other than the horizontal ones is specified by the coordinate addresses for the start and end points in one direction, that is, from top to bottom or from bottom to top. Each is then converted into approximate pixels in the X-Y coordinate system, and stored in a random access work memory. The pixels of each line segment are stored in the work memory according to a rule whereby each line segment is represented by one pixel per horizontal line, and is written by taking exclusive OR of its pixels, excluding the start point, with read pixel data at corresponding coordinate addresses in the work memory. Thus, an even number of contour line pixels exist in each horizontal line in the work memory, and, area fill can be realized by scanning each horizontal line in the work memory and turning on pixel memory cells from an odd numbered contour line pixel to an even numbered contour line pixel. This technique makes it possible to easily perform area fill even for complicated images.

4 Claims, 5 Drawing Sheets

IMAGE PROCESSING SYSTEM FOR AREA FILLING OF GRAPHICS

BACKGROUND OF THE INVENTION

1. Field of the Invention

This invention relates to an image processing system for generating an area-filled or painted image that is reproduced by an image reproducing device, such as an image display unit with a CRT or an image printer with a print head, and more particularly to an image processing system suitable for displaying an area filled image on a raster type CRT display.

2. Prior Art

Area-fill or painting is one of the basic image processing functions in an electronic image processing system, and various techniques have been heretofore proposed. The most basic technique is to use software for specifying areas to be filled in, and filling in the dots one by one for each pixel line in a random access memory so as to fill in all the pixels in the specified area. However, such area fill by software has the problem of requiring long processing time.

U.S. Pat. No. 4,189,743 to Schure et al discloses an area fill technique in which any one point in a closed contour line region written in a random access memory is selected as a seed point. The area fill is then performed first by filling a pixel line passing through the seed point in the range of the contour line, then, by filling in a pixel line adjacent to the first pixel line, and then repeating such procedure until area fill is completed. However, this technique requires a very complicated procedure.

Japanese Examined Patent Publication No. 40179/79 discloses a technique for displaying an area filled image in which a contour line pattern is written with some contour line dots selectively omitted so that each pixel line in a refresh memory includes an even number of contour line dots. As the pixel lines are read in synchronism with the CRT raster scanning, the video signal to the CRT is turned on at odd numbered contour line dots and turned off at even numbered contour line dots. However, the technique disclosed in this patent has problems in that: the distortion of the filled image, due to the omitted dots, is quite noticeable; processable images are limited; and an image cannot be processed in the refresh memory. In any event, the patent does not disclose the use of oriented vector data, and end point processing and area fill by exclusive OR as in the present invention.

The present invention seeks to provide an image processing system that can generate at high speed, and easily, a complicated, area filled image based on vector data representing a series of line segments constituting the contour of the image.

SUMMARY OF THE INVENTION

The present invention generates the contour lines of an image from vector data according to predetermined rules and stores them in a random access memory. The contour lines are specified as a series of line segments or vectors, but horizontal line segments in the image are not used. Each of the line segments, except the horizontal ones, is specified in one direction, e.g., from top to bottom or from bottom to top, and converted into approximate pixels. Each line segment is represented on a one pixel per horizontal line basis, but its start point is not written. Each of the pixels is written in a random access memory by exclusive ORing pixel data read from a corresponding coordinate address of the random access memory. Thus, even numbers of contourline-identifying pixels exist in each horizontal line in the random access memory, so that any complicated image can be easily area filled by the odd-even inversion writing method.

DETAILED DESCRIPTION OF THE PREFERRED EMBODIMENT

Firstly, a description will be presented outlining the area fill technique according to the present invention and the rules for the process used therein.

Figure 2:
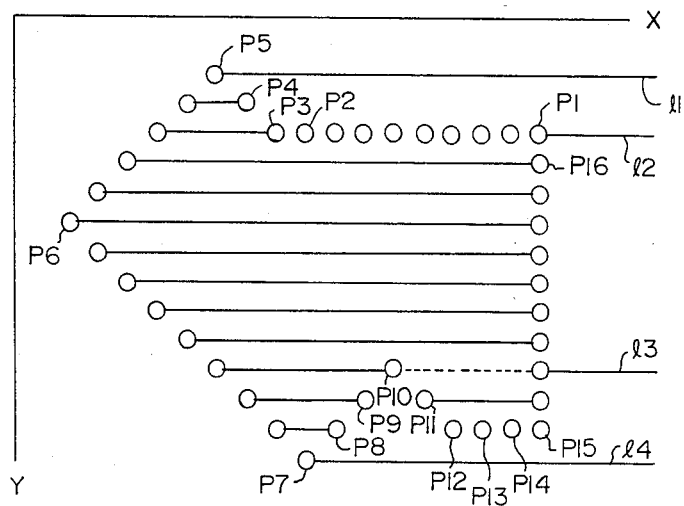
FIG. 2 shows an example of area fill when using a closed contour line.

FIG. 2 shows pixel dots of a closed contour line written in a random access memory that stores pixel data of a two-dimensional image in a corresponding two-dimensional plane XY. The figure illustrates the situation wherein the contour line pixels stored in a memory are scanned for each horizontal pixel line, and area fill is carried out by the odd-even inversion writing method wherein dots from an odd numbered contour line pixel to the next even numbered pixel are set on. If an odd number of contour line pixels exist on a pixel line, it will be seen that a problem is caused in that area not to be filled such as 11, 12, 13 and 14 in FIG. 2 are filled in, while areas that should be filled, such as the broken line portion of the line 13, are not filled in.

Figure 3:
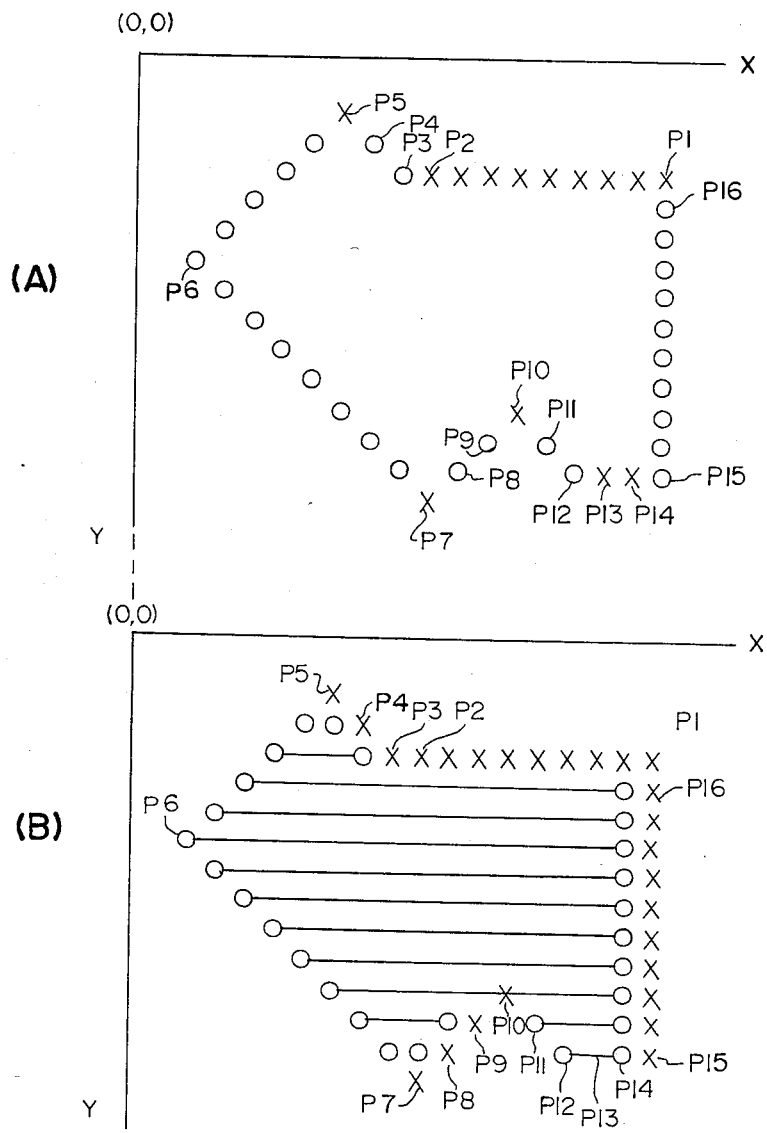
FIG. 3 shows an example of area fill according to the invention.

As shown in FIG. 3 (A), the present invention writes the contour lines in a random access memory in such a manner that each pixel line always contains an even number of contour line pixels and therefore can be easily area filled by the odd-even inversion writing method. In FIG. 3, "X" indicates a contour line pixel that is not written.

According to the present invention, the contour lines constituting an image are represented by a series of line segments or vectors. The line segments are converted into approximate pixel dots based on coordinate data indicating the start and end points of each line segment, which are then stored in the random access memory. The present invention uses the following five rules for writing contour line pixels as in FIG. 3.

RULE 1: Do not write horizontal line segments.
RULE 2: Represent each line segment on a one pixel per horizontal line basis.
RULE 3: Do not write the start point of each line segment.
RULE 4: Write the contour line pixel by taking exclusive OR with the pixel data that is stored at a memory address in the memory into which the pixel is intended to be written.
RULE 5: Specify each line segment in one direction, i.e., from top to bottom or from bottom to top.

Rule 1 is for preventing an odd number of contour line pixels from occurring on one line due to the contour line pixels contained in a horizontal contour line portion, such as pixels P1-P2 on the line l2 of FIG. 2. Since many horizontal lines are used in conventional image processing, omission of horizontal line segments also contributes to an increase of speed of the area fill process.

Figure 4:
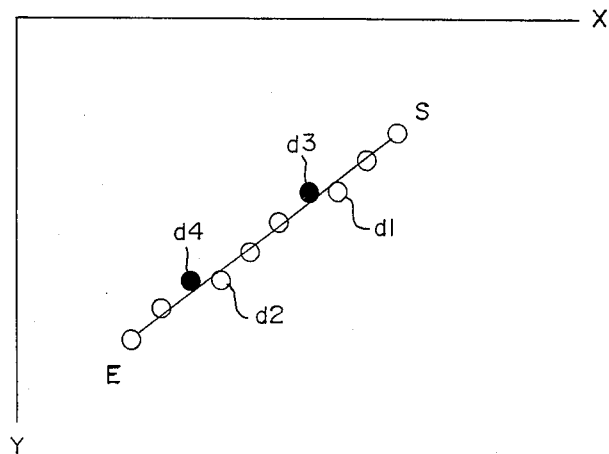
FIG. 4 shows an example of approximate pixel dots.

Rule 2 is for representing the contour in one pixel per line regardless of the angle or orientation of the line segment. For example, in the case of FIG. 4 where approximate dots are generated for a line segment having the start point S and the end point E and making an angle of less than 45° to the horizontal line, a plurality of dots are generated for one line. In such case, the dots d1 and d2 first generated are used as the contour line dots, but second dots d3 and d4 are not written.

Rule 3 is for eliminating an upward or downward apex. If the line segments are specified in one direction, for example, from top to bottom according to Rule 5, Rule 3 eliminates the contour line pixels P5 and P10 that are the upward apexes in FIG. 2.

Rules 4 and 5 eliminate the contour line pixel at an apex with opposite direction from that of the apex processed by Rule 3 (in this example, P7).

Now, an exemplary description will be presented on the procedure for writing the contour line pixel pattern in FIG. 3(A). The contour in FIG. 3 is specified by six line segments according to the rules. Assuming that the line segments are specified in the direction from top to bottom, they are represented by P5→P3, P5→P6, P6→P7, P10→P7, P10→P12, and P1→P15. Pixels P1→P2, P13 and P14 for horizontal line segments are ignored. For the line segment P5→P3, the pixel P5 for the start point is not written, but the following pixels are written to the end pixel P3. The write is performed by writing the exclusive OR of the pixel data to be written and pixel data read from the memory address into which the former data is to be written. Assuming that the contour line pixel is represented by binary 1 and the memory readout data is binary 0, the contour line pixel data will be written as it is.

Similarly, for the line segment P5→P6, the start point P5 is not written, but remaining pixels are set to binary 1. For the line segment P6→P7, although the start point P6 is not written, P6 has already been written for the segment P5→P6. Pixels including the end point P7 following the start point P6 are written by the exclusive OR.

For the segment P10→P7, the start point P10 is not written, but the following pixels are written. Since the end point P7 is binary 1 as a result of writing of the segment P6→P7, the exclusive OR writing of the end point P7 restores it to binary 0, and eliminates the downward apex P7 from the contour line. Similarly, the contour line dots of the segments P10→P12, and P1→P15 are written.

After completion of writing of the contour line pixels, each line in the memory is scanned, and a fill operation is performed such that the memory dots from an odd numbered contour line pixel to the next occurring even numbered contour line pixel are filled with binary 1. In this case, for reasons described hereinafter, it is preferable to make the even numbered contour line pixels binary 0. The write is preferably performed by reading the pixel data for each line from the memory, by taking the exclusive OR of each pixel and the immediately preceding pixel on the same line, and by writing the result. Therefore, as shown in FIG. 3 (B), binary 0 pixels following the odd numbered contour line pixels are set to binary 1. Although the pixel P10 was eliminated in writing the contour line, it is set to binary 1 at the stage of fill operation. The pixels P13 and P14 that were initially ignored are also filled. The pixels P1→P2, P5 and P7 that were initially eliminated are removed from the area filled image. It should be noted here that all of the even numbered contour line pixels on each line P3, P4, P8, P9 and P15→P16 are removed as a result of the fill operation with the exclusive OR. Therefore, distortion of the resultant image is minimized as compared with the approach in the above-mentioned Japanese Examined Patent Publication No. 40179/79 wherein the apex dots are simply omitted. Also, elimination of even numbered contour line pixels is advantageous in that adjacent images are easily generated. This will be described hereinafter.

Figure 1:
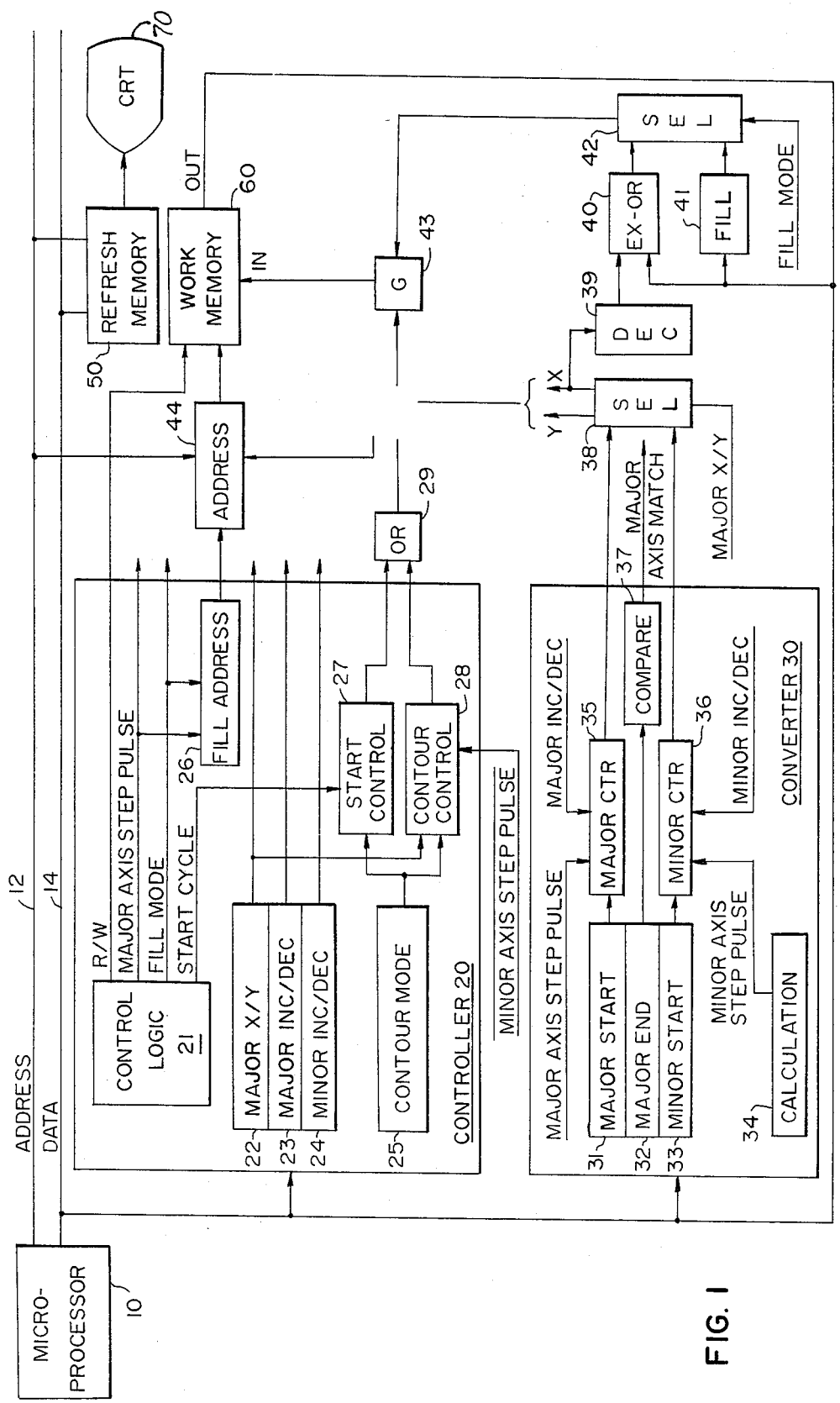
FIG. 1 is a schematic circuit diagram of a preferred embodiment of the invention.

FIG. 1 shows an embodiment of the invention applied to a raster scanning type CRT graphic display system. A microprocessor 10 is connected to a refresh memory 50, through an address line 12 and a data line 14, which refresh memory is then connected to a raster scanning type CRT display 70. The refresh memory 50 is a random access memory that has storage cells corresponding to pixel dots of the display 70. The display system also includes a contour line writing/area fill controller 20, a line segment-pixel dot converter 30, and a work memory 60 that is used for storing an area filled image. Although the embodiment generates an area filled image in the work memory 60, which is in turn written in the refresh memory 50 for displaying, it may be possible to directly write an area filled image in the refresh memory 50. However, it is preferable to use a separate work memory 60 because control becomes very complicated if the refresh memory has any image data. Particularly, use of the work memory is advantageous when image manipulation is performed on the refresh memory. Of course, the refresh memory 50 and the work memory 60 are not necessarily to be physically separated, but may be separate regions of a single memory.

The work memory 60 is, similar to the refresh memory, a random access memory that has storage cells corresponding to pixel dots of the two-dimensional image displayed on the display 70. According to the above-mentioned procedure, an area filled image is formed in the work memory 60 by writing the contour line pixels in the work memory, and then by setting the storage cells in the region defined by the contour to binary 1.

In operation, as described in connection with FIG. 3, the microprocessor 10 supplies sequentially coordinate addresses for the start and end points of a series of line segments that constitute the contour of an image to be area filled. The process is performed one segment at a time. Each segment is converted into approximate pixel dots by the line segment - pixel dot converter 30.

In the preferred embodiment, the converter operates under Bresenham's algorithm. This algoritbm is well known as disclosed in "Algorithm for Computer Control of a Digital Computer", in IBM System Journal, Vol. 4, No. 1, 1965, pp. 25-30. In short, the algorithm generates approximate pixels by defining as the major axis the larger one of the differences ($\Delta X$ and $\Delta Y$) between X coordinates and between Y coordinates for the start and end points of a vector, and the minor axis as the smaller one, and by selecting whether or not the coordinate value for the minor axis is to be stepped by one coordinate value, +1 or −1, each time the value for the major axis is stepped by one coordinate value, +1 or −1, from the start point to the end point.

The microprocessor 10 loads the coordinate values for the major axis start point, the major axis end point, and the minor axis start point of a line segment to be converted in registers 31, 32, and 33 of the converter 30, respectively. Also, the microprocessor 10 sets a signal indicating whether the major axis of the line segment is X or Y, in a register 22 of the controller 20. This depends on the angle of the line segment. Furthermore, the microprocessor 10 sets signals in registers 23 and 24 which indicate whether the coordinate values for the major and minor axes should be incremented or decremented when going from the start point to the end point of the line segment. In the example shown in FIG. 4, the major axis=X, the major axis-decrement and the minor axis-increment are set. A signal indicating the mode of contour line writing is also set in a register 25. If $\Delta X = \Delta Y$, it is sufficient to specify either X or Y as the major axis.

The major axis start point in the register 31 is set in a major axis counter 35, while the minor axis start point in the register 33 is loaded in a minor axis counter 36. The major axis counter 35 is incremented or decremented one by one by major axis step pulses from a control logic circuit 21. The direction of increment or decrement is controlled by the set value of the register 23. The minor axis counter 36 is incremented or decremented one by one by minor axis step pulses from a calculating circuit 34. The direction of increment or decrement depends on the set value of the register 24. The calculating circuit 34 determines, according to said Bresenham's algorithm, the most appropriate point by selecting "minor axis=not changed" or "minor axis=-stepped by one" each time the major axis is stepped by one, and generated a minor axis step pulse if the minor axis=stepped by one.

The value in the major axis counter 35 is compared with the major axis end point in the register 32 by a comparator 37, and the converter 30 continues to operate until these values are met. A selector 38 responds to the major axis indication in the register 22, and connects the major axis counter 35 to the X output and the minor axis counter 36 to the Y output if the major axis=X, or the major axis counter 35 and the minor axis counter 36 to Y and X outputs, respectively, if the major axis=Y. The major axis counter 35 and the minor axis counter 36 contain initially the coordinate values for the start point and are updated each time one approximate pixel dot is determined.

The refresh memory 50 and the work memory 60 store pixel data in eight bit bytes arranged in the direction of the x-axis, and are accessed by byte. Therefore, for converting a pixel address into a byte address, the combination of X higher address bits of X output from the selector 38 excluding the lower three bits and Y address bits of Y output from the selector 38 is supplied to an addressing circuit 44 to address a byte to be written. The lower three bits of X output are applied to a decoder 39, and converted into an eight-bit pattern i.e. eightpixel dot pattern with its pixel dot specified by the lower three bits set to binary 1 (for example, 011→00100000).

Access to the work memory is performed each time one approximate pixel dot is determined in the converter 30. In the contour line writing/fill operation, each work memory access cycle always involves a two-step operation of read and write. This is controlled by a read/write signal R/W from the control logic circuit. In the contour line writing mode, one byte is first read which is addressed by the higher bits of the X output and the bits of the Y output of the selector 38. The one byte read and the output of the decoder 39 are supplied to an exclusive OR (EX-OR) 40. The output of EX-OR 40 is supplied to a selector 42, which selects the output of EX-OR 40 in the mode and supplies it to a gate 43.

In writing following the reading, it is required to remove the start point and to write the contour line in one pixel per line, according to the above-mentioned Rules 2 and 3. A start point control circuit 27 of the controller 20 responds to the contour line mode signal from the register 25 and a contour line writing start cycle timing signal from the control logic circuit 21, and prohibits the gate 43 through OR 29 in the first work memory access cycle. A contour line control circuit 28 responds to (1) the contour line mode signal from the register 25, (2) an indication of the major axis=X from the register 22, and (3) an indication of no minor axis step pulse from the calculating circuit 34, and prohibits the gate 43 when the value of minor axis (Y) does not change. As described, for example, in FIG. 4, a plurality of approximate dots may be generated on the same X line when the major axis=X.

In this manner, the converter 30 generates continuously all approximate pixel dots from the start point to the end point in successive cycles, while the addressing circuit 44 accesses the work memory 60 in each cycle, but the start point and unnecessary dots are not written.

When the contour line pixels are written for one line segment, and the value of major axis counter 35 reaches that of the major axis end point in the register 32, the comparator 37 generates a major axis match signal, which is supplied to the microprocessor 10 to notify completion of writing of one line segment.

The microprocessor 10 is responsive to the major axis match signal to set the coordinate values of the start and end points of the next line segment in the registers 31, 32, and 33, and similarly performs the conversion of line segment to pixel dots and the writing of contour line pixels. The operation continues similarly until processing of the last line segment is completed. The microprocessor 10 supplies a fill instruction signal (not shown) to the control logic circuit 21 in the controller 20 in response to generation of the major axis match signal from the comparator 37 in the processing of the last line segment. The control circuit 21 is responsive to the instruction signal to generate a fill mode signal, and, in response to it, the selector 42 is switched to cause the output of a fill circuit 41 to pass through the gate 43.

Figure 5:
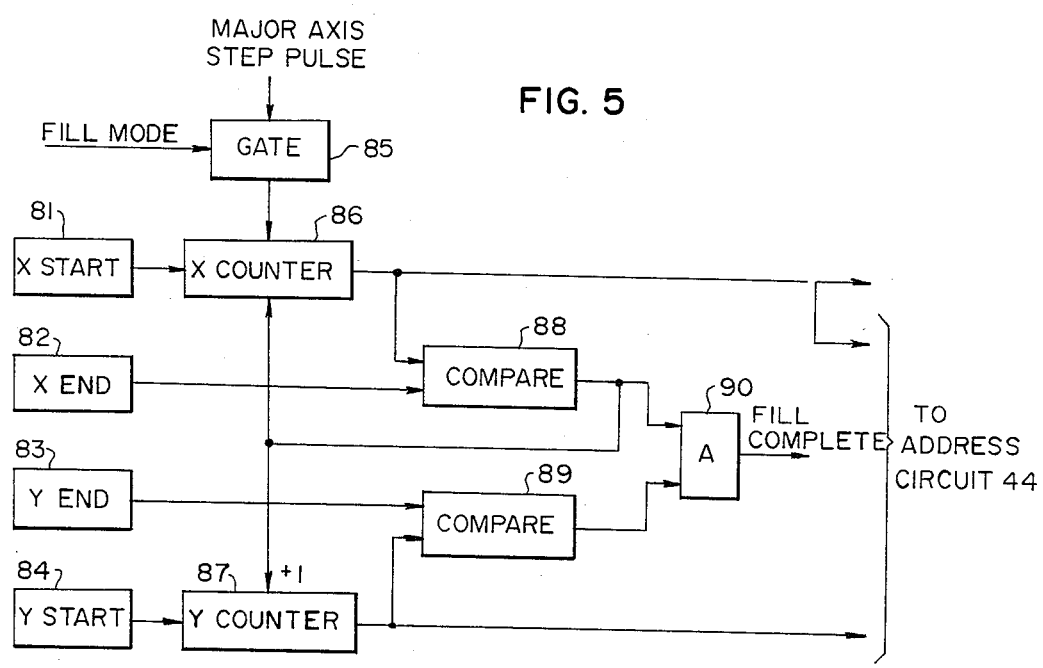
FIG. 5 shows the details of a fill address generator circuit such as circuit 26 in FIG. 1.

A fill address generator circuit 26 of the controller 20 responds to the fill mode signal and the major axis step pulses and generates to the addressing circuit 44 addresses for reading data in the work memory one byte at a time for each X line. FIG. 5 shows an example of the fill address generator circuit 26. Values of X start point, X end point, Y start point and Y end point which define any rectangular region surrounding the contour written in the work memory 60, preferably a rectangular region slightly larger than the contour, are set in registers 81, 82, 83 and 84 by the microprocessor 10. Values in the X start point register 81 and the Y start point register 84 are loaded in an X counter 86 and a Y counter 87. A gate circuit 85 supplies the major axis step pulses to the X counter 86 in response to the fill mode signal. Therefore, the X counter 86 is successively stepped. Bits in the X counter 86 excluding the lower three bits and bits in the Y counter 87 are provided to the addressing circuit 44 as a byte address. When the value of the X counter 86 becomes equal to the X end point, a comparator 88 generates an X match output, increments the Y counter 87 by one, resets the X counter 86, and reloads the X start point in the X counter 86. The operation continues similarly, and a comparator 89 generates a Y match output when the value of Y counter 87 becomes equal to the Y end point. When the reading of all bytes at the specified rectangular region is completed, both the X and Y match outputs are generated, and an AND circuit 90 supplies a fill completion signal to the microprocessor 10.

Figure 6:
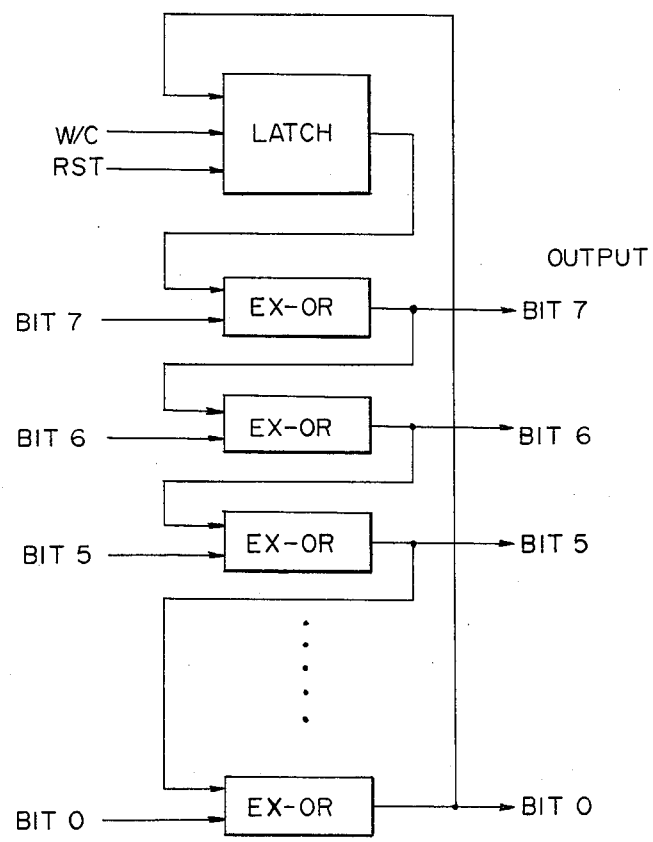
FIG. 6 shows the details of a fill circuit such as circuit 41 in FIG. 1.

FIG. 6 shows the fill circuit 41. It comprises a latch and eight EX-OR circuits. The input of the latch is connected to the output of the EX-OR for bit 0, and its output is connected to the input of the EX-OR for bit 7. The EX.ORs for bits 7-2 are connected to the inputs of the EX-ORs for bits 6-0. The byte read is supplied to the input terminals of bits 7-0. For example, assuming that bit 6 of the read byte is binary 1, and is the first odd numbered contour line pixel dot, then each of the EX-ORs of bits 6-0 generates an output of binary 1. Since the latch is reset by a reset signal RST (not shown in FIG. 1) from the control logic circuit 21 prior to start of the operation, bit 7 output is 0, and therefore, 01111111 is stored at the same byte address. After writing, a write completion signal (W/C) (not shown in FIG. 1) from the control logic circuit 21 latches the binary 1 output from the EX-OR of bit 0 into the latch, and supplies binary 1 to the input of the EX-OR of bit 7. Therefore, this circuit continues to generate all binary 1 outputs as long as pixel bits of binary 0 are read thereafter. Assuming that the first even numbered contour line pixel dot is generated at bit 5 of a byte, the EX-OR of bit 5 will generate binary 0 and bits 4-0 also become binary 0. Thus, the fill operation between the first odd and even numbered dots is completed and the latch is set to binary 0. Similarly, when the second odd numbered dot is detected on the line, filling to the next even numbered dot is performed. The latch is also reset after completion of scanning for each X line. This circuit causes even numbered contour line pixels to be eliminated.

After completion of the fill operation, the microprocessor 10 provides an address to the addressing circuit 44, reads the area filled image in the work memory 60 one byte at a time, and writes it in the refresh memory 50. The area filled image may be written at any position in the refresh memory 50. In the case of a monochrome display, the refresh memory 50 will have a signal pixel memory plane, while, in the case of a gray scale or color display with multiple bits for one pixel, it will have a plurality of memory planes corresponding to the number of bits. In such case, the area filled image can be stored in the refresh memory in any desired intensity level or color by commonly supplying memory address input and data input to the memory planes and selecting planes to be written.

Figure 7:
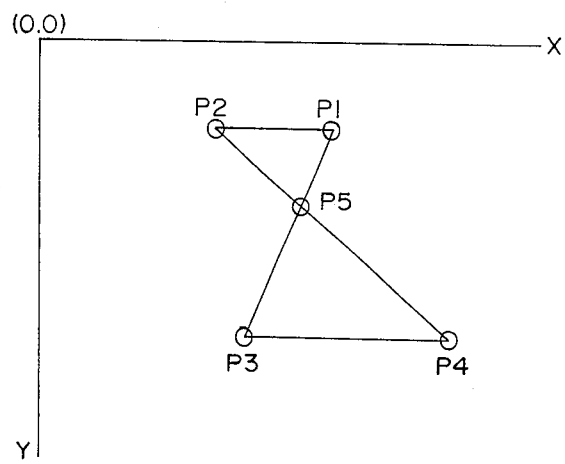
FIG. 7 shows an example of an area filled image.

Finally, the advantages of the invention are as follows:

1. first, it is possible to area fill easily and at high speed any complicated image even if it has a plurality of upward or downward apexes;
2. it can minimize the distortion of an original image caused by removal of apexes because it not only removes the apexes, but also turns off even numbered contour line pixels in the course of the fill operation;
3. it simplifies specifying of line segments because horizontal line segments are omitted;
4. it can area fill an image containing crossing lines (for example, in the image of FIG. 7, contour lines can be specified by two line segments, P1→P3 and P2→P4; a pixel P5 will be written in the segment P1→P3, but restored to binary 0 by the EX-OR writing of the segment P2→P4; thus, area fill can be done without processing of the intersection); and
5. it can generate adjacent images with completely conformed boundaries since even numbered contour line pixels are eliminated.

For example, in a case where an area filled image is added adjacent to a previous area filled image, or an adjacent area filled image is displayed in a color different from a previous image, it is required to create an image adjacent to the previous image after the previous image is moved to the refresh memory. In such a case, the invention enables the drawing of the contour lines by using line segments used in the previous image. For example, in FIG. 3, if it is desired to create an adjacent image which is contiguous to the previous image at its top, right, and bottom sides, then the contour of the adjacent image may be specified using the same line segments P5→P3, P1→P15, P10→P7, and P10→P12. Since the pixel 10 is not written, there occurs no interference with the previous image. The pixels P9, P8 and P7 are written, while the pixels P11 and P12 are eliminated in the course of the fill operation. Therefore, no gap or overlap occurs between the images.

Although a particular embodiment has been described herein, it will be clear to those skilled in the art that various modifications could be made within the scope of the invention. For example, although the embodiment uses the separate address generator circuit 26, the converter 30 may be used in place of the circuit 26 as will be noted from the similarity between the circuits. In such case, the registers 31, 32 and 33 of the converter 30 may be used in place of the registers 81, 82 and 84 of the circuit 26, but it will be required to add a minor axis end point register corresponding to the Y end point register 83, a comparator corresponding to the comparator 89, and an AND circuit corresponding to the AND circuit 90. In addition, it will be required in the fill mode to gate the output of the comparator 37 as the minor axis step pulse to the minor axis counter 36. Although, in the embodiment, the control for the start point removal and the one pixel per line writing are performed by prohibiting the data gate 43, a similar gate may be provided at the output of the converter 30, for example.

It will therefore be seen that with the present invention it is possible to area fill an electronic image easily and rapidly even when the image is of a complicated composition.

We claim:

1. In a graphic image processing system including:
   an image reproducing device;
   a random access memory having storage cells for storing pixel data of a two-dimensional image; and
   means for producing an area filled image in said memory for reproduction by said image reproducing device;
   the improvement wherein said image producing means comprises:
   means for specifying the pixel data for each of a series of line segments constituting the contour of an image beginning from one side of the image and proceeding toward the opposite side and omitting horizontal line segments;

means for generating approximate pixels of each specified line segment;

means responsive to said generating means for writing contour line pixels in said memory, comprising:
- means for writing the exclusive OR of the contour pixel data and the existing pixel data read from the storage cell into which said contour pixel data is to be written;
- means for omitting the start point of each line segment; and
- means for limiting the representation of each line segment to one pixel per horizontal line; and means for scanning the contour line pixels written in said memory line by line and setting on the storage cells between an odd numbered contour pixel occurring in a line and the next occurring even numbered contour pixel in said line.

2. A system as in claim 1 wherein said scanning means comprises:
- means for reading contour pixel data for each horizontal line from said memory;
- fill circuit means, having an exclusive OR circuit, for producing an exclusive OR output for each pixel and the immediately preceding pixel on the same horizontal line: and
- means for writing the output of said exclusive OR in said memory as fill data so that even numbered contour line pixels are erased by the fill operation.

3. A method for producing an area filled graphic image by writing into a memory device, having storage cells for storing pixel data of said image, for readout on an image reproducing device, comprising the steps of:
- specifying the pixel data for each of a series of line segments constituting the contour of an image;
- writing the pixels of all of said line segments by beginning from one side of the image and proceeding toward the opposite side;
- omitting the writing for horizontal line segments;
- omitting the writing of the start point of each line segment;
- writing only one pixel per horizontal line for each line segment;
- writing the pixels of each line segment by writing the exclusive OR of the pixel data to be written and the existing pixel data read from the memory address of the storage cell into which said written pixel data is to be written; and
- scanning the line segment pixels written by the preceding steps horizontally line by line and setting on the storage cells between an odd numbered line segment pixel occurring in a line and the next occurring even numbered line segment pixel in said line.

4. A method as in claim 3 wherein said scanning step comprises:
- reading pixel data from said memory device for each horizontal line
- taking the exclusive OR of each pixel and the immediately preceding pixel on each horizontal line; and
- writing the output of said exclusive OR in said memory device as fill data so that even numbered contour line pixels are erased by the fill operation.

* * * * *